US008133561B2

(12) United States Patent
Schmitz et al.

(10) Patent No.: US 8,133,561 B2
(45) Date of Patent: Mar. 13, 2012

(54) MULTI-LAYER COMPOSITE COMPRISING AN EVOH LAYER AND A PROTECTIVE LAYER

(75) Inventors: Guido Schmitz, Duelmen (DE); Harald Haeger, Freigericht (DE); Hans Ries, Marl (DE)

(73) Assignee: Evonik Degussa GmbH, Essen (DE)

( * ) Notice: Subject to any disclaimer, the term of this patent is extended or adjusted under 35 U.S.C. 154(b) by 1403 days.

(21) Appl. No.: 10/588,487

(22) PCT Filed: Aug. 10, 2005

(86) PCT No.: PCT/EP2005/053946
§ 371 (c)(1),
(2), (4) Date: Aug. 4, 2006

(87) PCT Pub. No.: WO2006/040206
PCT Pub. Date: Apr. 20, 2006

(65) Prior Publication Data
US 2008/0317986 A1    Dec. 25, 2008

(30) Foreign Application Priority Data

Oct. 7, 2004    (DE) .......................... 10 2004 048 776

(51) Int. Cl.
*B32B 1/08*    (2006.01)
(52) U.S. Cl. .................. 428/36.9; 428/35.7; 428/36.91; 428/36.6; 428/474.4; 428/474.9; 138/118; 138/137; 138/DIG. 1; 138/DIG. 7
(58) Field of Classification Search .................. 428/35.7; 138/118, 121, 140, DIG. 1, DIG. 7
See application file for complete search history.

(56) References Cited

U.S. PATENT DOCUMENTS

| | | | |
|---|---|---|---|
| 5,313,987 A | 5/1994 | Röber et al. | |
| 5,404,915 A | 4/1995 | Mugge et al. | |
| 5,500,263 A | 3/1996 | Rober et al. | |
| 5,512,342 A | 4/1996 | Rober et al. | |
| 5,554,426 A | 9/1996 | Rober et al. | |
| 5,763,034 A | 6/1998 | Nishino et al. | |
| 5,798,048 A | 8/1998 | Ries | |
| 5,858,492 A | 1/1999 | Roeber et al. | |
| 6,090,459 A | 7/2000 | Jadamus et al. | |
| 6,161,879 A | 12/2000 | Ries et al. | |
| 6,170,534 B1 | 1/2001 | Noone et al. | |
| 6,335,101 B1 | 1/2002 | Haeger et al. | |
| 6,355,358 B1 | 3/2002 | Boer et al. | |
| 6,391,982 B1 | 5/2002 | Haeger et al. | |
| 6,407,182 B1 | 6/2002 | Maul et al. | |
| 6,428,866 B1 | 8/2002 | Jadamus et al. | |
| 6,451,395 B1 | 9/2002 | Ries et al. | |
| 6,528,137 B2 | 3/2003 | Franosch et al. | |
| 6,538,073 B1 | 3/2003 | Oenbrink et al. | |
| 6,579,581 B2 | 6/2003 | Bartz et al. | |
| 6,660,796 B2 | 12/2003 | Schueler et al. | |
| 6,677,015 B2 | 1/2004 | Himmelmann et al. | |
| 6,680,093 B1 | 1/2004 | Ries et al. | |
| 6,726,999 B2 | 4/2004 | Schueler et al. | |
| 6,766,091 B2 | 7/2004 | Beuth et al. | |
| 6,783,821 B2 | 8/2004 | Ries et al. | |
| 6,793,997 B2 | 9/2004 | Schmitz | |
| 6,794,048 B2 | 9/2004 | Schmitz et al. | |
| 7,025,842 B2 | 4/2006 | Monsheimer et al. | |
| 2001/0018105 A1 | 8/2001 | Schmitz et al. | |
| 2002/0142118 A1 | 10/2002 | Schmitz et al. | |
| 2003/0072987 A1 | 4/2003 | Ries et al. | |
| 2003/0124281 A1 | 7/2003 | Ries et al. | |
| 2003/0212174 A1 | 11/2003 | Peirick et al. | |
| 2004/0140668 A1 | 7/2004 | Monsheimer et al. | |
| 2004/0202908 A1 | 10/2004 | Schmitz et al. | |
| 2004/0265527 A1 | 12/2004 | Schmitz et al. | |
| 2006/0078752 A1 | 4/2006 | Schmitz et al. | |
| 2006/0083882 A1 | 4/2006 | Schmitz et al. | |
| 2006/0099478 A1 | 5/2006 | Schmitz et al. | |
| 2006/0100323 A1 | 5/2006 | Schmidt et al. | |
| 2006/0141188 A1 | 6/2006 | Schmitz et al. | |
| 2006/0281873 A1 | 12/2006 | Alting et al. | |
| 2009/0044906 A1 | 2/2009 | Goring et al. | |

FOREIGN PATENT DOCUMENTS

WO        97 12758        4/1997

OTHER PUBLICATIONS

U.S. Appl. No. 12/438,142, filed Feb. 20, 2009, Luetzeler, et al.
U.S. Appl. No. 12/438,364, filed Feb. 23, 2009, Luetzeler, et al.
U.S. Appl. No. 12/373,547, filed Jan. 13, 2009, Luetzeler, et al.
U.S. Appl. No. 12/302,298, filed Nov. 25, 2008, Alting, et al.
U.S. Appl. No. 11/685,283, filed Mar. 13, 2007, Dowe, et al.
U.S. Appl. No. 11/816,595, filed Aug. 17, 2007, Haeger, et al.
U.S. Appl. No. 11/816,588, filed Aug. 17, 2007, Haeger, et al.
U.S. Appl. No. 11/816,556, filed Aug. 17, 2007, Wursche, et al.
U.S. Appl. No. 11/813,103, filed Jun. 29, 2007, Baumann, et al.
U.S. Appl. No. 08/609,612, filed Mar. 1, 1996, Jadamus, et al.
U.S. Appl. No. 10/580,194, filed May 23, 2006, Kuhmann, et al.
U.S. Appl. No. 10/589,264, filed Aug. 14, 2006, Wursche, et al.
U.S. Appl. No. 11/586,526, filed Oct. 26, 2006, Wursche, et al.
U.S. Appl. No. 12/515,543, filed May 20, 2009, Wursche, et al.

*Primary Examiner* — Michele L Jacobson
(74) *Attorney, Agent, or Firm* — Oblon, Spivak, McClelland, Maier & Neustadt, L.L.P.

(57) ABSTRACT

A multilayer composite which comprises the following layers: I. an interior layer I selected from among a fluoropolymer molding composition and a polyolefin molding composition; II. a bonding agent layer II which has the following composition: a) from 0 to 80 parts by weight of a polyamine-polyamide graft copolymer, b) from 0 to 85 parts by weight of polyamide, c) from 0 to 85 parts by weight of a polymer selected from among fluoropolymers and polyolefins; with the sum of the parts by weight of a), b) and c) being 100; and, in addition, the sum of the components a) and b) comprising at least 20 parts by weight of monomer units derived from caprolactam and/or the combination hexamethylenediamine/adipic acid, hexamethylenediamine/suberic acid, hexamethylenediamine/sebacic acid, hexamethylenediamine/dodecanedioic acid, hexamethylenediamine/isophthalic acid or hexamethylenediamine/terephthalic acid and d) not more than 50 parts by weight of additives selected from among impact-modifying rubber and customary auxiliaries and additives; III. a layer III comprising an EVOH molding composition, has improved adhesion of the layers.

20 Claims, No Drawings

MULTI-LAYER COMPOSITE COMPRISING AN EVOH LAYER AND A PROTECTIVE LAYER

The invention relates to a multilayer composite which has a barrier layer comprising an ethylene-vinyl alcohol copolymer (EVOH) and a protective layer comprising a material which forms a barrier against alcohols and is selected from among a fluoropolymer and a polyolefin.

In the development of multilayer composites which are used, for example, as pipes for conveying liquid or gaseous media in motor vehicles, the molding compositions used have to have a sufficient chemical resistance toward the media to be conveyed and the pipes have to be able to meet all the mechanical demands made of them, even after long-term exposure to fuels, oils or heat. Apart from the requirement of a sufficient fuel resistance, the automobile industry demands an improved barrier action of the fuel lines in order to reduce the emissions of hydrocarbons into the environment. This has led to the development of multi-layer pipe systems in which, for example, EVOH is used as barrier layer material. Systems of this type are described, for example, in U.S. Pat. No. 5,038,883, U.S. Pat. No. 5,076,329 and EP-A-1 216 826. However, these known pipes have the disadvantage that the barrier action against alcohols is not satisfactory and the interior layer has an unsatisfactory barrier action against water, which over time gets into the EVOH layer and results in a further deterioration in the barrier action against alcohols.

To solve this problem, EP-A-0 559 445 proposes applying a fluoropolymer layer as innermost layer. Fluoropolymer layer and EVOH layer are joined to one another by means of a bonding agent. Bonding agents disclosed are ethylene-acrylic ester copolymers, ethylene-vinyl acetate copolymers, polyolefins bearing epoxy groups and graft copolymers of vinylidene fluoride and methyl methacrylate. However, it is not demonstrated that this achieves any adhesion at all, much less permanent adhesion. Due to the constituents disclosed, some of which are soluble in fuels, these coupling agents do not have satisfactory fuel resistance and have an unsatisfactory heat distortion resistance. In addition, a person skilled in the art will not readily be able to repeat the work in this respect on the basis of the very general teachings of EP-A-0 559 445.

As a modification of this, a polyolefinic interior layer is also able to improve the barrier action against alcohols and, in particular, to protect the EVOH from water. However, here too there is the problem that satisfactory adhesion has to be achieved.

It is accordingly an object of the invention to develop a bonding agent which makes possible good adhesion between the EVOH and the fluoropolymer or polyolefin. A further object is to make possible a bond which is not adversely affected by contact with fuel. Furthermore, the bond should be maintained to a satisfactory extent during the time over which the composite is used. Overall, a very simple technical solution is desirable.

These objects are achieved by a multilayer composite which comprises the following layers:

I. an interior layer I selected from among an adhesion-modified or unmodified fluoropolymer molding composition and an adhesion-modified or unmodified polyolefin molding composition;

II. a bonding agent layer II which has the following composition:
 a) from 0 to 80 parts by weight, preferably from 1 to 60 parts by weight and particularly preferably from 3 to 40 parts by weight, of a graft copolymer prepared using the following monomers:
   from 0.5 to 25% by weight, based on the graft copolymer, of a polyamine having at least 4, preferably at least 8 and particularly preferably at least 11, nitrogen atoms and a number average molecular weight $M_n$ of preferably at least 146 g/mol, particularly preferably at least 500 g/mol and very particularly preferably at least 800 g/mol, and
   polyamide-forming monomers selected from among lactams, ω-aminocarboxylic acids and equimolar combinations of diamine and dicarboxylic acid;
 b) from 0 to 100 parts by weight, preferably from 10 to 75 parts by weight and particularly preferably from 25 to 65 parts by weight, of polyamide,
 c) from 0 to 85 parts by weight, preferably from 5 to 75 parts by weight, particularly preferably from 10 to 65 parts by weight and very particularly preferably from 20 to 55 parts by weight, of a polymer selected from among fluoropolymers and polyolefins,
 with the sum of the parts by weight of a), b) and c) being 100,
 and, in addition,
  the sum of the components a) and b) comprising at least 20 parts by weight, preferably at least 40 parts by weight and particularly preferably at least 60 parts by weight, of monomer units derived from caprolactam and/or the combination hexamethylenediamine/adipic acid, hexamethylenediamine/suberic acid, hexamethylenediamine/sebacic acid, hexamethylenediamine/dodecanedioic acid, hexamethylenediamine/isophthalic acid or hexamethylenediamine/terephthalic acid and
 d) not more than 50 parts by weight, preferably not more that 30 parts by weight and particularly preferably not more than 20 parts by weight, of additives selected from among impact-modifying rubber and customary auxiliaries and additives;

III. a layer III comprising an EVOH molding composition.

The multilayer composite is generally a pipe or a hollow body.

The fluoropolymer used for layer I can be, for example, a polyvinylidene fluoride (PVDF), an ethylene-tetrafluoroethylene copolymer (ETFE), an ETFE modified by means of a third component such as propene, hexafluoropropene, vinyl fluoride or vinylidene fluoride (for example EFEP), an ethylene-chlorotrifluoroethylene copolymer, (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoroalkyl vinyl ether copolymer (PFA).

If the bonding agent of the layer II itself does not contain a sufficient amount of fluoropolymer, the fluoropolymer of layer I is preferably adhesion-modified, i.e. functional groups which can react with amino groups of the bonding agent and thus make bonding of the phases possible are present. Such adhesion modification can generally be achieved in two ways:
  either the fluoropolymer contains built-in functional groups, for example acid anhydride groups or carbonate groups, as described in U.S. Pat. No. 5,576,106, US-A-2003148125, US-A-2003035914, US-A-2002104575, JP-A-10311461, EP-A-0 726 293, EP-A-0 992 518 or WO 9728394;
  or the fluoropolymer molding composition comprises a polymer containing functional group which is miscible or at least compatible with the fluoro-polymer. Such systems are disclosed, for example, in EP-A-0 637 511 or the US equivalent U.S. Pat. No. 5,510,160 and in EP-A-0 673 762 or the US equivalent U.S. Pat. No. 5,554,426, which are hereby expressly incorporated by reference. The modified fluoropolymer of EP-A-0 673 762 comprises from 97.5 to 50% by weight, preferably from 97.5 to 80% by weight and particularly preferably from 96 to 90% by weight, of PVDF and from 2.5 to 50% by weight, preferably from 2.5 to 20% by weight and particularly preferably from 4 to 10% by weight, of an acrylate copolymer comprising at least the following basic building blocks:
  i) from 14 to 85% by weight of ester building blocks,
  ii) from 0 to 75% by weight of imide building blocks,
  iii) from 0 to 15% by weight of carboxylic acid building blocks and
  iiii) from 7 to 20 parts by weight of carboxylic acid anhydride building blocks.

For further details, the reader is referred to the documents referred to, whose contents are hereby expressly incorporated by reference into the disclosure of the present patent application.

The polyolefin which is alternatively used for layer I can be, first and foremost, a polyethylene, in particular a high density polyethylene (HDPE), or an isotactic polypropylene. The polypropylene can be a homopolymer or a copolymer, for example with ethylene or 1-butene as comonomer, with both random and block copolymers being able to be used. Furthermore, the polypropylene can also be impact-modified, for example, as disclosed in the prior art, by means of ethylene-propylene rubber (EPM) or EPDM.

When the bonding agent of layer II itself does not contain a sufficient amount of polyolefin, the polyolefin of layer I is then preferably adhesion-modified by the presence of functional groups which can react with amino groups of the bonding agent. Suitable functional groups are first and foremost carboxyl groups, carboxylic acid anhydride groups, carbonate groups, acyllactam groups, oxazoline groups, oxazine groups, oxazinone groups, carbodiimide groups or epoxide groups.

The functional groups are, as disclosed in the prior art, grafted onto the polyolefin chain by reaction with olefinically unsaturated functional compounds such as acrylic acid, maleic acid, fumaric acid, monobutyl maleate, maleic anhydride, aconitic anhydride, itaconic anhydride or vinyloxazoline, generally by means of free radicals and/or thermally, or they are incorporated into the main chain by free-radical copolymerization of the olefinically unsaturated functional compounds with the olefin.

In the case of the graft copolymer of the component II.a), the amino group concentration is preferably in the range from 100 to 2500 mmol/kg.

As polyamine, it is possible to use, for example, the following classes of substances:
  polyvinylamines (Römpp Chemie Lexikon, 9th edition, volume 6, page 4921, Georg Thieme Verlag Stuttgart 1992);
  polyamines prepared from alternating polyketones (DE-A 196 54 058);
  dendrimers such as ((H$_2$N—(CH$_2$)$_3$)$_2$N—(CH$_2$)$_3$)$_2$—N (CH$_2$)$_2$—N((CH$_2$)$_2$—N((CH$_2$)$_3$—NH$_2$)$_2$)$_2$ (DE-A-196 54 179) or tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-[bis(2-aminoethyl)amino]ethyl]-9-[2-[bis[2-bis(2-aminoethyl)-amino]ethyl]amino]ethyl]-3,6,9,12,15-pentaaza-heptadecane-1,17-diamine (J. M. Warakomski, Chem. Mat. 1992, 4, 1000-1004);
  linear polyethylenimines which can be prepared by polymerization of 4,5-dihydro-1,3-oxazoles and subsequent hydrolysis (Houben-Weyl, Methoden der Organischen Chemie, volume E20, pages 1482-1487, Georg Thieme Verlag Stuttgart, 1987);
  branched polyethylenimines which are obtained by polymerization of aziridines (Houben-Weyl, Methoden der Organischen Chemie, volume E20, pages 1482-1487, Georg Thieme Verlag Stuttgart, 1987) and generally have the following amino group distribution:
    from 25 to 46% primary amino groups,
    from 30 to 45% secondary amino groups and
    from 16 to 40% tertiary amino groups.

In the preferred case, the polyamine has a number average molecular weight $M_n$ of not more than 20 000 g/mol, particularly preferably not more than 10 000 g/mol and very particularly preferably not more than 5000 g/mol.

Lactams or T-aminocarboxylic acids used as polyamide-forming monomers contain from 4 to 19 and in particular from 6 to 12 carbon atoms. Particular preference is given to using γ-caprolactam, γ-aminocaproic acid, caprylolactam, T-aminocaprylic acid, laurolactam, T-aminododecanoic acid and/or T-aminoundecanoic acid.

Combinations of diamine and dicarboxylic acid are, for example, hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. In addition, it is also possible to use all other combinations such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/T-aminoundecanoic acid, decamethylenediamine/dodecanedioic acid/laurolactam, decamethylenediamine/terephthalic acid/laurolactam or dodecamethylene-diamine/2,6-naphthalenedicarboxylic acid/laurolactam.

In a preferred embodiment, the graft copolymer is prepared using, in addition, an oligocarboxylic acid selected from among from 0.015 to about 3 mol % of dicarboxylic acid and from 0.01 to about 1.2 mol % of tricarboxylic acid, in each case based on the sum of the other polyamide-forming monomers. In these percentages, each of the monomers diamine and dicarboxylic acid are considered individually in the equivalent combination of diamine and dicarboxylic acid. In this way, the polyamide-forming monomers have an overall slight excess of carboxyl groups. If a dicarboxylic acid is used, preference is given to adding from 0.03 to 2.2 mol %, particularly preferably from 0.05 to 1.5 mol %, very particularly preferably from 0.1 to 1 mol % and in particular from 0.15 to 0.65 mol %; if a tricarboxylic acid is used, preference is given to using from 0.02 to 0.9 mol %, particularly preferably from 0.025 to 0.6 mol %, very particularly preferably from 0.03 to 0.4 mol % and in particular from 0.04 to 0.25 mol %. The concomitant use of the oligo-carboxylic acid significantly improves the solvent and fuel resistance, in particular the hydrolysis and alcoholysis resistance and the environmental stress cracking resistance, but also the swelling behavior and, associated therewith, the dimensional stability and the barrier action against diffusion.

As oligocarboxylic acid, it is possible to use any dicarboxylic or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

In addition, it is possible to use, if desired, aliphatic, alicyclic, aromatic aralkylic and/or alkylaryl-substituted monocarboxylic acids having from 3 to 50 carbon atoms, e.g. lauric acid, unsaturated fatty acids, acrylic acid or benzoic acid, as regulators. These regulators make it possible to reduce the concentration of amino groups without altering the structure of the molecule. In addition, functional groups such as double or triple bonds, etc., can be introduced in this way. However, it is desirable for the graft copolymer to have a substantial proportion of amino groups. The amino group concentration of the graft copolymer is particularly preferably in the range from 150 to 1500 mmol/kg, in particular in the range from 250 to 1300 mmol/kg and very particularly preferably in the range from 300 to 1100 mmol/kg. Here and in the following, the term amino groups refers not only to terminal amino groups but also to any secondary or tertiary amine functions which may be present in the polyamine.

The preparation of these graft copolymers is described in more detail in EP-A-1 065 048.

The polyamide of component II.b) preferably comprises PA6, PA66, PA6/66, PA68, PA610, PA612, polyamides derived from hexamethylenediamine together with isophthalic acid and/or terephthalic acid, copolyamides based on these types or mixtures thereof.

PA6/66 is a copolycondensate prepared from the monomers caprolactam, hexamethylenediamine and adipic acid.

As fluoropolymer and as polyolefin which can optionally be present as constituent of component II.c), it is possible to use the same compounds as for layer I. In this case, when the layer I comprises a fluoropolymer molding composition, the component II.c) can likewise comprise a fluoropolymer, preferably of the same type, while the use of a polyolefin in the component II.c) does not improve adhesion of the layers in this case.

In an analogous manner, the component II.c) can, when the layer I comprises a polyolefin molding composition, likewise comprise a polyolefin, preferably of the same type, while the use of a fluoropolymer in the component II.c) does not improve adhesion of the layers in this case.

The fluoropolymer or the polyolefin which is optionally present in component II.c) is preferably adhesion-modified as described above. In this case adhesion modification of the molding composition of layer I can be dispensed with.

As auxiliaries and/or additives in component II.d), it is possible to use, for example, plasticizers, flame retardants, stabilizers, processing aids, sheet silicates, pigments, nucleating agents or the like.

EVOH has been known for a long time. It is a copolymer of ethylene and vinyl alcohol and is sometimes also referred to as EVAL. The ethylene content of the copolymer is generally from 25 to 60 mol % and in particular from 28 to 45 mol %. Many types are commercially available. For example, reference may be made to the company brochure "Introduction to Kuraray EVAL™ Resins", version 1.2/9810 from Kuraray EVAL Europe.

Apart from the layers I to III, further layers can be additionally present in the composite of the invention, for example a layer V which comprises a polyamide molding composition or a polyolefin molding composition and is joined to the layer III by means of a suitable bonding agent (layer IV). Bonding agents suitable for this purpose are prior art. This polyamide or polyolefin layer can additionally be adjoined by sheathing comprising a rubber or a thermoplastic elastomer. A further, innermost fluoropolymer or polyolefin layer can equally well adjoin the interior layer I.

In one embodiment, the multilayer composite additionally comprises a regrind layer. Scrap arises every now and again in the production of composites according to the invention, for example during start-up of the extrusion plant or in the form of flash in extrusion blow molding, or in the finishing of pipes. A regrind layer made of this scrap is embedded between two other layers so that any brittleness of the regrind blend is very largely compensated.

The multilayer composite of the invention is, for example, a pipe, a filling port or a container, in particular for conveying or storing liquids or gases. Such a pipe can be smooth or corrugated or is corrugated only in subsections. Corrugated pipes are prior art (e.g. U.S. Pat. No. 5,460,771), which is why further details on this subject are unnecessary. Important uses of such multilayer composites are use as fuel line, as tank filling port, as vapor line (i.e. a line in which fuel vapors are conveyed, e.g. ventilation lines), as filling station line, as coolant line, as air conditioner line or as fuel container, for instance a canister or a tank.

When the multilayer composite of the invention is used for conveying or storing flammable liquids, gases or dusts, e.g. fuel or fuel vapors, it is advisable to make the layers of which the composite is composed or an additional interior layer electrically conductive. This can be achieved by compounding with an electrically conductive additive using all methods of the prior art. As conductive additive, it is possible to use, for example, conductive carbon black, metal flakes, metal powders, metalized glass spheres, metalized glass fibers, metal fibers (for example of stainless steel), metalized whiskers, carbon fibers (including metalized carbon fibers), intrinsically conductive polymers or graphite fibrils. Mixtures of various conductive additives can also be used.

In the preferred case, the electrically conductive layer is in direct contact with the medium to be conveyed or stored and has a surface resistance of not more than $10^9$ Σ/square and preferably not more than $10^6$ Σ/square. The measurement method for determining the resistance of multilayer pipes is described in SAE J 2260 (November 1996, paragraph 7.9).

The multilayer composite can be manufactured in one or more stages, for example by means of a single-stage process employing the method of multicomponent injection molding, coextrusion, coextrusion blow molding (for example also 3D blow molding, extrusion of the parison into an open mold half, 3D parison manipulation, suction blow molding, 3D suction blow molding, sequential blow molding) or by means of multi-stage processes, e.g. coating.

The invention is illustrated by way of example below. In the examples, the following molding compositions were used:

Interior Layer (Layer I):

Fluoropolymer 1: mixture as described in EP-A-0 673 762 composed of 95% by weight of a commercial PVDF and 5% by weight of a polyglutarimide made up of the following basic building blocks:
  57% by weight derived from methyl methacrylate,
  30% by weight of the N-methyl-glutarimide type,
  3% by weight derived from methacrylic acid and
  10% by weight of the glutaric anhydride type
  (prepared by reaction of methyl methacrylate with an aqueous solution of methylamine in the melt).

Fluoropolymer 2: NEOFLON® RP 5000 from Daikin Industries Ltd., Japan, a modified EFEP Fluoropolymer 3: NEOFLON® RP 5000 AS from Daikin Industries Ltd., Japan, a modified EFEP which has been made electrically conductive Polyolefin 1: STAMYLAN® P 83 MF 10, a PP copolymer from DSM Deutschland GmbH Polyolefin 2: VESTOLEN® A 6013, an HDPE from DSM Deutschland GmbH Bonding Agent (Layer II and IV):

Preparation of the Graft Copolymer:

9.5 kg of laurolactam were melted at 180° C.-210° C. in a heating-up vessel and transferred to a pressure-rated polycondensation vessel; 475 g of water and 0.54 g of hypophosphorous acid were subsequently added. The dissociation of the lactam was carried out at 280° C. under the autogenous pressure; the mixture was then depressurized to a residual water vapor pressure of 5 bar over a period of 3 hours and 500 g of polyethylenimine (LUPASOL G 100 from BASF AG, Ludwigshafen) and 15 g of dodecanedioic acid were added. Both components were incorporated under the autogenous pressure; the mixture was subsequently depressurized to atmospheric pressure and nitrogen was then passed over the melt at 280° C. for 2 hours. The clear melt was discharged as a strand by means of a melt pump, cooled in a water bath and subsequently pelletized.

HV 1: 12.6 kg of a PA6 (ULTRAMID® B4 from BASF AG), 22.82 kg of fluoropolymer 2 and 5.0 kg of the graft copolymer were melt-mixed on a twin-screw compounder ZE 25 33D from Berstorff at 270° C. and 150 rpm and a throughput of 10 kg/h, extruded and pelletized.

HV 2: a PA6 (ULTRAMID® B4 from BASF AG)

HV 3: like HV 1, except that the fluoropolymer 2 was replaced by polypropylene grafted with maleic anhydride (ADMER® QB 520 E from Mitsui Chemicals Inc., Japan)

HV 4: like HV 1, except that the fluoropolymer 2 was replaced by polyethylene grafted with maleic anhydride (ADMER® NF 408 E from Mitsui Chemicals Inc., Japan)

HV 5: an intimate mixture of 35.3% by weight of VESTAMID® D22 (PA612 from Degussa AG), 48.1% by weight of ULTRAMID® B5W (a PA6 from BASF AG), 10.7% by weight of the graft copolymer and 5.4% by weight of EXXELOR® VA1803 (ethylene-propylene rubber functionalized with maleic anhydride from EXXON) was prepared at 280° C. by means of a twin-screw extruder Berstorff ZE 25, extruded as a strand, pelletized and dried.

EVOH Layer (Layer III):

EVAL® F101, an EVOH from KURARAY containing 32 mol % of ethylene

Outer Layer (Layer V):

PA12: an impact-modified, plasticized polyamide from Degussa AG (VESTAMID® X 7293)

Polyolefin 2: as above

EXAMPLES 1 to 5

Pipes having the dimensions 8×1 mm were produced at an extrusion speed of about 12 m/min on a 5-layer unit equipped with two model 45 extruders and three model 30 extruders.

| Example | Interior layer = layer I | Layer II | Layer III | Layer IV | Layer V |
|---|---|---|---|---|---|
| 1 | 0.1 mm of fluoropolymer 1 | 0.2 mm of HV 2 | 0.1 mm of EVOH | 0.2 mm of HV 5 | 0.4 mm of PA12 |
| 2 | 0.1 mm of fluoropolymer 2 | 0.2 mm of HV 1 | 0.1 mm of EVOH | 0.2 mm of HV 5 | 0.4 mm of PA12 |
| 3 | 0.1 mm of fluoropolymer 3 | 0.2 mm of HV 1 | 0.1 mm of EVOH | 0.2 mm of HV 5 | 0.4 mm of PA12 |
| 4 | 0.1 mm of polyolefin 1 | 0.2 mm of HV 3 | 0.1 mm of EVOH | 0.2 mm of HV 5 | 0.4 mm of PA12 |
| 5 | 0.1 mm of polyolefin 2 | 0.2 mm of HV 4 | 0.1 mm of EVOH | 0.2 mm of HV 4 | 0.4 mm of polyolefin 2 |

Characterization of the Pipes:

In the case of the pipes of examples 1 to 5, the adhesion between the interior fluoropolymer or polyolefin layer and the EVOH layer was so high that the composite could not be separated at this point both when freshly extruded and after storage in fuel (interior contact storage using CM 15, viz. a test fuel composed of 42.5% by volume of isooctane, 42.5% by volume of toluene and 15% by volume of methanol, at 80° C. with weekly fuel change, 1000 h).

The fracture rate in the low-temperature impact toughness test at −40° C. in accordance with SAE J 2260 of all pipes, both freshly extruded and after storage in fuel (interior contact storage using CM 15 at 80° C. with weekly fuel change, 1000 h), was in each case 0/10.

The invention claimed is:

1. A multilayer composite comprising the following layers:
   I. an interior layer I selected from the group consisting of a fluoropolymer molding composition and a polyolefin molding composition;
   II. a bonding agent layer II that has the following composition:
      a) from 0 to 80 parts by weight of a graft copolymer prepared using the following monomers:
         from 0.5 to 25% by weight, based on the graft copolymer, of a polyamine having at least 4 nitrogen atoms and
         polyamide-forming monomers selected from the group consisting of lactams, ω-aminocarboxylic acids and equimolar combinations of diamine and dicarboxylic acid;
      b) from 0 to 100 parts by weight of polyamide, and
      c) from 0 to 75 parts by weight of a polymer selected from the group consisting of fluoropolymers and polyolefins,
   with the sum of the parts by weight of a), b) and c) being 100, and, in addition,
      the sum of the components a) and b) comprising at least 20 parts by weight of monomer units based on 100 parts by weight of a), b) and c), derived from caprolactam and/or the combination hexamethylenediamine/adipic acid, hexamethylenediamine/suberic acid, hexamethylenediamine/sebacic acid, hexamethylenediamine/dodecanedioic acid, hexamethylenediamine/isophthalic acid or hexamethylenediamine/terephthalic acid and
      d) not more than 50 parts by weight of additives selected from the group consisting of impact-modifying rubber and auxiliaries and additives; and
   III. a layer III comprising an EVOH molding composition,
   wherein layer II is between layer I and layer III.

2. The multilayer composite as claimed in claim 1, wherein the component II.a) is present in an amount of from 1 to 60 parts by weight and/or
the component II.b) is present in an amount of from 10 to 75 parts by weight.

3. The multilayer composite as claimed in claim 1, wherein
the component II.a) is present in an amount of from 3 to 40 parts by weight and/or
the component II.b) is present in an amount of from 25 to 65 parts by weight.

4. The multilayer composite as claimed in claim 1, wherein from 5 to 75 parts by weight of the component II.c) are present.

5. The multilayer composite as claimed in claim 4, wherein from 10 to 65 parts by weight of the component II.c) are present.

6. The multilayer composite as claimed in claim 4, wherein from 20 to 55 parts by weight of the component II.c) are present.

7. The multilayer composite as claimed in claim 1, wherein interior layer I comprises the fluoropolymer molding composition, which comprises a fluoropolymer selected from the group consisting of PVDF, ETFE, ETFE modified by a third component, E-CTFE, PCTFE, THV, FEP and PFA.

8. The multilayer composite as claimed in claim 1, wherein interior layer I comprises the polyolefin molding composition, which comprises polyethylene or isotactic polypropylene.

9. The multilayer composite as claimed in claim 1, wherein the fluoropolymer or the polyolefin is adhesion-modified.

10. The multilayer composite as claimed in claim 1, wherein component II.b, is present and the polyamide of the component II.b, comprises PA6, PA66, PA6/66, PA68, PA610, PA612, a polyamide derived from hexamethylenediamine together with isophthalic acid and/or terephthalic acid or mixtures thereof.

11. The multilayer composite as claimed in claim 1, further comprising a layer comprising a polyamide molding composition or a polyolefin molding composition and is joined to the layer III by a suitable bonding agent.

12. The multilayer composite as claimed in claim 1 that is a pipe or a hollow body.

13. The multilayer composite as claimed in claim 1 that is a pipe corrugated in its entirety or in subregions.

14. The multilayer composite as claimed in claim 1 that is a fuel line, a brake fluid line, a coolant line, a hydraulic fluid line, a filling station line, an air conditioner line, a vapor line, a container or a filling port.

15. The multilayer composite as claimed in claim 1, wherein one of the layers of which the composite is composed or an additional interior layer has been made electrically conductive.

16. The multilayer composite as claimed in claim 1 produced by coextrusion, coating, multicomponent injection molding or coextrusion blow molding.

17. The multilayer composite as claimed in claim 1, wherein interior layer I comprises the fluoropolymer molding composition.

18. The multilayer composite as claimed in claim 1, wherein interior layer I comprises the polyolefin molding composition.

19. The multilayer composite as claimed in claim 1, wherein the EVOH of the EVOH molding composition has an ethylene content of 25 to 60 mol %.

20. The multilayer composite as claimed in claim 1, wherein bonding agent layer II comprises PA6.

* * * * *